(12) United States Patent
Lee et al.

(10) Patent No.: US 11,876,217 B2
(45) Date of Patent: Jan. 16, 2024

(54) LITHIUM SECONDARY BATTERY

(71) Applicant: SK INNOVATION CO., LTD., Seoul (KR)

(72) Inventors: Yong Seok Lee, Daejeon (KR); Jung Hwan Kim, Daejeon (KR); Myung Ro Lee, Daejeon (KR); Sang Won Bae, Daejeon (KR); Ji Hee Bae, Daejeon (KR)

(73) Assignee: SK ON CO., LTD., Seoul (KR)

( * ) Notice: Subject to any disclaimer, the term of this patent is extended or adjusted under 35 U.S.C. 154(b) by 228 days.

(21) Appl. No.: 16/875,306

(22) Filed: May 15, 2020

(65) Prior Publication Data

US 2020/0365883 A1 Nov. 19, 2020

(30) Foreign Application Priority Data

May 15, 2019 (KR) .......................... 10-2019-0056665

(51) Int. Cl.
*H01M 4/36* (2006.01)
*H01M 4/13* (2010.01)
(Continued)

(52) U.S. Cl.
CPC ............ *H01M 4/366* (2013.01); *H01M 4/133* (2013.01); *H01M 4/364* (2013.01); *H01M 4/483* (2013.01);
(Continued)

(58) Field of Classification Search
CPC ............ H01M 4/36; H01M 4/62; H01M 4/48; H01M 4/587; H01M 4/133
See application file for complete search history.

(56) References Cited

U.S. PATENT DOCUMENTS

2007/0092797 A1* 4/2007 Konishiike ............ H01M 4/386
29/623.5
2013/0122378 A1* 5/2013 Oh ..................... H01M 10/0567
429/334
(Continued)

FOREIGN PATENT DOCUMENTS

CN 104617328 A 5/2015
CN 104956530 A 9/2015
(Continued)

OTHER PUBLICATIONS

Machine Translation of: Kim et al. (KR-10-2019-0029320 A), Mar. 20, 2019.*
(Continued)

*Primary Examiner* — Kenneth J Douyette
(74) *Attorney, Agent, or Firm* — IP & T GROUP LLP

(57) ABSTRACT

A lithium secondary battery includes a cathode, a separator, and an anode including an anode current collector and an anode active material layer formed on the anode current collector and facing the cathode with the separator interposed therebetween. The anode active material layer includes a first anode active material layer formed on the anode current collector and including a first anode active material and a first anode binder containing a styrene-butadiene-based rubber (SBR) binder and a second anode active material layer formed on the first anode active material layer and including a second anode active material and a second anode binder containing a acryl-based binder. Each of the first anode active material and the second anode active material includes a silicon-based active material and a graphite-based material and contains 2 to 9.5 parts by weight of silicon with respect to the 100 part by weight of the graphite-based active material.

13 Claims, 1 Drawing Sheet

(51) Int. Cl.
  *H01M 4/48* (2010.01)
  *H01M 4/58* (2010.01)
  *H01M 4/133* (2010.01)
  *H01M 4/587* (2010.01)
  *H01M 4/62* (2006.01)
  *H01M 10/0525* (2010.01)
  *H01M 4/02* (2006.01)

(52) U.S. Cl.
  CPC ............ *H01M 4/587* (2013.01); *H01M 4/622* (2013.01); *H01M 10/0525* (2013.01); *H01M 2004/027* (2013.01)

(56) References Cited

U.S. PATENT DOCUMENTS

| | | | |
|---|---|---|---|
| 2014/0287316 A1* | 9/2014 | Ahn | H01M 4/587 429/233 |
| 2014/0349185 A1* | 11/2014 | Momose | H01M 4/623 525/218 |
| 2018/0219217 A1 | 8/2018 | Park et al. | |

FOREIGN PATENT DOCUMENTS

| | | | |
|---|---|---|---|
| CN | 108428895 A | 8/2018 | |
| CN | 109273673 A | 1/2019 | |
| JP | 4392169 B2 | 12/2009 | |
| JP | 5924550 B2 | 5/2016 | |
| KR | 10-2005-0081950 A | 8/2005 | |
| KR | 10-2013-0054127 A | 5/2013 | |
| KR | 10-2014-0044802 A | 4/2014 | |
| KR | 10-1478814 B | 1/2015 | |
| KR | 10-2016-0087121 A | 7/2016 | |
| KR | 10-2017-0075963 A | 7/2017 | |
| KR | 10-1764072 B | 8/2017 | |
| KR | 20170107213 A | 9/2017 | |
| KR | 10-2017-0111725 A | 10/2017 | |
| KR | 10-2018-0023820 A | 3/2018 | |
| KR | 10-2018-0034664 A | 4/2018 | |
| KR | 10-1875031 B | 7/2018 | |
| KR | 10-2019-0029320 A | 3/2019 | |
| WO | 2013161786 A1 | 10/2013 | |

OTHER PUBLICATIONS

Extended European Search Report issued by the EPO dated Jul. 16, 2020.

First Office Action for the Chinese Patent Application No. 202010409011.0 issued by the Chinese Patent Office dated Jun. 27, 2023.

Office Action for the Korean Patent Application No. 10-2020-0058194 issued by the Korean Patent Office dated Oct. 31, 2023.

* cited by examiner

LITHIUM SECONDARY BATTERY

CROSS-REFERENCE TO RELATED APPLICATION AND CLAIM OF PRIORITY

This application claims priority to Korean Patent Applications No. 10-2019-0056665 filed on May 15, 2019 in the Korean Intellectual Property Office (KIPO), the entire disclosure of which is incorporated by reference herein.

BACKGROUND

1. Field

The present invention relates to a lithium secondary battery. More particularly, the present invention relates to lithium secondary battery including a plurality of types of anode active materials and binders.

2. Description of the Related Art

A secondary battery which can be charged and discharged repeatedly has been widely employed as a power output source of a mobile electronic device such as a camcorder, a mobile phone, a laptop computer, etc., according to developments of information and display technologies. Recently, the secondary battery or a battery pack including the same is being developed and applied as an eco-friendly power output source of an electric automobile such as a hybrid vehicle.

The secondary battery includes, e.g., a lithium secondary battery, a nickel-cadmium battery, a nickel-hydrogen battery, etc. Among them, the lithium secondary battery is actively developed and applied due to high operational voltage and energy density per unit weight, high charging rate and light weight.

For example, the lithium secondary battery may include an electrode assembly including a cathode, an anode and a separation layer, and an electrolyte immersing the electrode assembly. The lithium secondary battery may further include an outer case having, e.g., a pouch shape.

Recently, as the application range of the lithium secondary battery is expanded, development of a lithium secondary battery having a higher capacity and output is in progress. For example, anode or cathode materials that can provide higher capacity are being studied.

For example, alternative materials for anodes including conventional carbon-based materials are being studied. When the material of the anode is changed, the binder contacting or reacting with the anode needs to be changed or newly designed. However, mechanical deformation of the anode may be caused by the changed binder, and in this case, stability or life of the anode or the battery may be deteriorated.

For example, Korean Patent Registration Publication No. 10-1764072 discloses a binder for lithium iron-phosphate electrode coated with carbon.

SUMMARY

According to an aspect of the present invention, there is provided a lithium secondary battery having improved mechanical stability and operation reliability.

According to exemplary embodiments of the present invention, a lithium secondary battery includes a cathode, a separator and an anode including an anode current collector and an anode active material layer formed on the anode current collector and facing the cathode with the separator interposed therebetween. The anode active material layer includes a first anode active material layer formed on the anode current collector and including a first anode active material and a first anode binder containing a styrene-butadiene-based rubber (SBR) binder and a second anode active material layer formed on the first anode active material layer and including a second anode active material and a second anode binder containing a acryl-based binder. Each of the first anode active material and the second anode active material includes a silicon-based active material and a graphite-based material and contains 2 to 9.5 parts by weight of silicon (Si) with respect to the 100 part by weight of the graphite-based active material.

According to exemplary embodiments, the second anode binder may include a copolymer of poly(acrylic acid) and poly(vinyl alcohol) (a PAA-PVA copolymer).

According to exemplary embodiments, the first anode binder may include a mixture of SBR and a carboxymethyl cellulose (CMC).

According to exemplary embodiments, a loading weight including the second anode active material and the second anode binder within the second anode active material layer may be larger than a loading weight including the first anode active material and the first anode binder within the first anode active material layer.

According to exemplary embodiments, the loading weight within the second anode active material layer may be 1 to 4 times the loading weight within the first anode active material layer.

According to exemplary embodiments, the anode active material layer may include an overlapping region in which the SBR-based binder and the acryl-based binder are mixed, and the overlapping region may be adjacent to an interface between the first anode active material layer and the second anode active material layer.

According to exemplary embodiments, a content of the SBR-based binder within an upper layer portion of the first anode active material layer which is adjacent to the second anode active material layer may be larger than a content of the SBR-based binder within an lower layer portion of the first anode active material layer which is adjacent to the anode current collector.

According to exemplary embodiments, a content of the acryl-based binder within an upper layer portion of the second anode active material layer which is adjacent to an outer surface may be larger than a content of the acryl-based binder within an lower layer portion of the second anode active material layer which is adjacent to the first anode active material layer.

According to exemplary embodiments, the graphite-based active material may include a mixture of an artificial graphite and a natural graphite.

According to exemplary embodiments, a weight ratio of the artificial graphite to the natural graphite may be in range of 0.5 to 10.

According to exemplary embodiments, a weight ratio of the artificial graphite to the natural graphite may be in range of 2 to 10.

According to exemplary embodiments, a elongation rate of the anode measured under a condition in which a thickness of the anode current collector is 8 μm or more, and a total thickness of the anode active material layer is 50 μm to 200 μm may be 5% or more.

According to exemplary embodiments, the silicon-based active material may include $SiO_x$ (0<x<2).

The lithium secondary battery according to embodiments of the present invention may include an anode active material layer having a multi-layered structure including different binders, respectively. According to exemplary embodiments, a first anode active material layer adjacent to an anode current collector y include a styrene-butadiene rubber (SBR)-based binder, and a second anode active material layer formed on the first anode active material layer may include an acryl-based binder.

The anode active material may include a silicon-based active material and a carbon-based active material. So that, through the first anode active material layer, adhesion strength can be improved and wrinkle of an electrode can be prevented, and, through the second anode active material layer, electrode expansion and deformation caused by the silicon-based active material can be suppressed. Therefore, output, capacity and mechanical and chemical stability of the battery can be improved through the silicon-based active material.

DETAILED DESCRIPTION OF THE EMBODIMENTS

Exemplary embodiments of the present invention provide a lithium secondary battery including an anode active material layer having a multi-layer structure including different binder compositions. The lithium secondary battery has improved mechanical stability and battery performance.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
FIG. 1 is a schematic cross-sectional view illustrating an electrode assembly of a lithium secondary battery in accordance with exemplary embodiments.

FIG. 1 is a schematic cross-sectional view illustrating an electrode assembly of a lithium secondary battery in accordance with exemplary embodiments.

Referring to FIG. 1, an electrode assembly 50 may include a cathode 70 and an anode 80 disposed to face each other with a separator 60 interposed therebetween.

The cathode 70 may include a cathode current collector 72 and a cathode active material layer 75 formed on a surface of the cathode current collector 72.

The cathode current collector 72 may include stainless-steel, nickel, aluminum, titanium, copper or an alloy thereof. Preferably, aluminum or an alloy thereof may be used.

The cathode active material layer 75 may be formed on at least one of top and bottom surfaces of the cathode current collector 72. According to exemplary embodiments, the cathode active material layer 75 may be formed on the top and bottom surfaces of the cathode current collector 72, respectively.

In exemplary embodiments, the cathode active material may be mixed and stirred together with a cathode binder, a conductive additive and/or a dispersant in a solvent to form a cathode slurry. The cathode slurry may be coated on the cathode current collector 72, and pressed and dried to obtain the cathode 70.

The cathode active material may include a compound capable of reversibly intercalating and deintercalating a lithium ion.

In exemplary embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 1 below.

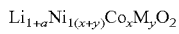  [Chemical Formula 1]

In Chemical Formula 1 above, a, x, and y may be in a range of $-0.05 \leq a \leq 0.15$, $0.01 \leq x \leq 0.3$, $0.01 \leq y \leq 0.3$. And, M may be at least one element selected from a group consisting of Mn, Mg, Sr, Ba, B, Al, Ti, Zr and W.

The cathode binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) and may be used with a thickener such as carboxymethyl cellulose (CMC).

For example, a PVDF-based binder may be used as the cathode binder. In this case, an amount of the binder for forming the cathode active material layer 75, and an amount of the cathode active material particle may be relatively increased. Thus, capacity and power output of the lithium secondary battery may be improved.

The conductive additive may be included to facilitate an electron mobility between the active material particles. For example, the conductive additive may include a carbon-based conductive additive such as graphite, carbon black, graphene, carbon nanotube, etc., and/or a metal-based conductive additive such as tin, tin oxide, titanium oxide, a perovskite material such as $LaSrCoO_3$ or $LaSrMnO_3$.

The anode 80 may include an anode current collector 82 and an anode active material layer formed on a surface of the anode current collector 82. The anode active material layer may be formed on at least one of top and bottom surfaces of the anode current collector 82. According to exemplary embodiments, the anode active material layer may be formed on the top and bottom surfaces of the anode current collector 82, respectively.

For example, the anode current collector 82 may include gold, stainless-steel, nickel, aluminum, titanium, copper or an alloy thereof. Preferably, copper or an alloy thereof may be used.

The anode active material layer may have a multilayer structure. According to exemplary embodiments, the anode active material layer may include a first anode active material layer 84 and a second anode active material layer 86 sequentially stacked from a surface of the anode current collector 82.

The first anode active material layer 84 may contact a surface of the anode current collector 82. The first anode active material layer 84 may include a first anode active material and a first anode binder. For example, a first anode slurry may be prepared by mixing the first anode active material and the first anode binder with a conductive additive and/or a dispersant. After the first anode slurry is applied on the anode current collector 82, a first anode active material layer 84 may be formed through drying and pressing processes.

According to exemplary embodiments, the first anode active material may include a silicon (Si)-based active material and/or a carbon-based active material, preferably a mixture or blend of a silicon-based active material and a carbon-based active material.

The carbon-based active material may be exemplified as a graphite, a hard carbon, a soft cation, cokes, etc. In some embodiments, a graphite-based material may be used as the carbon-based active material. Preferably, a mixture of a natural graphite and an artificial graphite may be used.

For example, A silicon oxide ($SiO_x$; $0<x<2$) particle may be used as the silicon-based active material.

In some embodiments, the mixture or blend of the silicon-based active material and the carbon-based active material may include a silicon-carbon-based active material. The silicon-carbon-based active material may include, for example, silicon carbide (SiC) or a silicon-carbon particle having a core-shell structure. The silicon-carbon particle may be formed, for example, by depositing a silicon layer on a surface of a graphite core. In one embodiment, the silicon-carbon particle may be formed by coating a silicon layer on a commercially available graphite particle through a chemical vapor deposition (CVD) process using a silicon precursor compound such as a silane-based compound.

Conventionally, a carbon-based active material has been mainly used as the anode active material, and the theoretical capacity of the carbon-based active material may be limited to about 370 mAh/g. However, according to exemplary embodiments, the silicon-based active material may be used together to significantly improve the output and capacity characteristics of the secondary battery beyond the theoretical capacity limit of the carbon-based active material.

Additionally, the carbon-based active material may be used together to buffer excessive electrode expansion occurred during repeated charge/discharge because of the silicon-based active material.

According to exemplary embodiments, in respect of the anode active material, the weight ratio of silicon (Si) to the carbon-based active material (e.g., graphite-based active material) may be in range of about 0.02 to 0.095. The content of silicon and the weight ratio with respect to the carbon-based active material may be measured and calculated by Inductively Coupled Plasma (ICP) emission spectroscopy.

When the weight ratio of the silicon-based active material is less than about 0.02, improvement about capacity and output through the silicon-based active material may not be sufficiently implemented. When the weight ratio of the silicon-based active material exceeds about 0.095, suppression for anode expansion may not be sufficiently implemented through a binder for an anode described below.

In one preferred embodiment, the carbon-based active material may include artificial graphite. The artificial graphite has a relatively enhanced lifespan characteristic compared to a natural graphite, and thus can compensate for a decrease in electrode life and stability due to use of the silicon-based active material.

In one embodiment, when the carbon-based active material includes artificial graphite and natural graphite together, the weight ratio of artificial graphite to natural graphite may range from about 0.5 to 10. Within the above range, while improving mechanical stability of the anode or the secondary battery through artificial graphite, capacity and output can be additionally improved through natural graphite. Preferably, artificial graphite may be included in further amount to improve mechanical and chemical stability of the anode.

In one embodiment, the weight ratio of artificial graphite to natural graphite may range from about 2 to 10.

According to exemplary embodiments, the first anode binder may include a styrene butadiene rubber (SBR)-based binder. In some embodiments, the first anode binder may include a mixture or blend of SBR and carboxymethyl cellulose (CMC).

The first anode binder including the SBR-based binder may have excellent adhesion to the anode current collector 82 and the anode active material compared to an acryl-based binder described later. Therefore, even when the silicon-based active material expands, the first anode active material layer 84 may function as an adhesive layer that prevents overall peeling, lifting, cracking, void occurring, etc. of the anode active material layer.

For example, in the first anode binder, the weight ratio of SBR to CMC may be in a range of about 1 to 3, preferably about 1 to 2. In a preferred embodiment, a content of SBR in the first anode binder may be greater than a content of CMC. In the above range, adhesion strength can be sufficiently improved through SBR while securing a thickening effect through CMC.

For example, the conductive additive may include a carbon-based conductive additive such as carbon black, graphene, carbon nanotube, etc., and/or a metal-based conductive additive such as tin, tin oxide, titanium oxide, a perovskite material such as $LaSrCoO_3$ or $LaSrMnO_3$.

In some embodiments, a content of the first anode active material in the total weight of the first anode slurry based on solid content may be about 90 to 98% by weight, a content of the first anode binder may be about 1 to 5% by weight, and a content of the conductive additive may be about 0.5 to 5% by weight.

The second anode active material layer 86 may formed on the first anode active material layer 84. The second anode active material layer 86 may include a second anode active material and a second anode binder.

For example, a second anode slurry may be prepared by mixing the second anode active material and the second anode binder with a conductive additive and/or a dispersant. After the second anode slurry is applied on the first anode active material layer 84, a second anode active material layer 86 may be formed through drying and pressing processes.

The second anode active material may have a composition substantially equal to or similar to the first anode active material described above.

Through this, the second anode active material may include a silicon (Si)-based active material and/or a carbon-based active material, preferably a mixture or blend of a silicon-based active material and a carbon-based active material (e.g., graphite-based active material).

In respect of the second anode active material, the weight ratio of silicon (Si) included in the second anode active material to the carbon-based active material (e.g., graphite-based active material) may be in range of about 0.02 to 0.095. The carbon-based active material may include artificial graphite and natural graphite together. In this case, the weight ratio of artificial graphite to natural graphite may range from about 0.4 to 10, preferably about 2 to 10.

According to exemplary embodiments, the second anode binder may include an acryl-based binder. The acryl-based binder may have a relatively high tensile strength (modulus) and can prevent decomposition and collapse of the active material by suppressing expansion and contraction of the silicon-based active material. Therefore, a stable capacity and output of the secondary battery may be maintained for a long time even during repeated charging and discharging.

In some embodiments, the acryl-based binder may include poly(acrylic acid) (PAM and/or polyacrylamide. For example, a solid electrolyte interphase (SEI) layer may be formed on a surface of a silicon-based active material by interaction of a carboxyl group of PAA or an amide group of polyacrylamide with an electrolyte. Accordingly, while preventing irreversible decomposition of the electrolyte, excessive expansion of the silicon-based active material can be suppressed.

In some embodiments, the acryl-based binder may be blended with poly(vinyl alcohol) (PVA). Polyvinyl alcohol may be included to further promote formation of the SEI layer through hydrophilic interaction.

In one preferred embodiment, the acryl-based binder may include a copolymer of PVA and PAA. For example, the acryl-based binder may include a repeating unit represented by Chemical Formula 1 below.

[Chemical Formula 1]

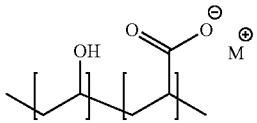

In Chemical Formula 1, M may represent an alkali metal such as Li and Na. The acryl-based binder may be present in a salt form of an acrylic acid in a anode active material layer or in an electrolyte as Chemical Formula 1.

The second anode slurry may also use a conductive additive and/or a dispersant that is substantially equal to or similar to the first anode slurry described above.

In some embodiments, a content of the second anode active material in the total weight of the second anode slurry based on solid content may be about 90 to 98% b weight, a content of the second anode binder may be about 1 to 5% by weight, and a content of the conductive additive may be about 0.5 to 5% by weight.

As described above, output and capacity of a secondary battery may be increased by using a silicon-based active material together in the anode active material layers 84 and 86. Additionally, by including an acryl-based binder having a relatively high tensile strength in the second anode active material layer 86, repetition of expansion and contraction during charging/discharging of the silicon-based active material can be suppressed or reduced.

Since the acryl-based binder has a high tensile strength, electrode wrinkle may be occurred when the acryl-based binder directly contacts the anode current collector 82. However, according to exemplary embodiments, the first anode active material layer 84 including a SBR binder may be formed between the anode current collector 82 and the second anode active material layer 86.

An overall adhesion strength of the anode active material layer may be improved through the first anode active material layer 84 having relatively high adhesion. Damage and defect of the anode 80 due to expansion and contraction of an electrode may be suppressed through the second anode active material layer 86. Additionally, the second anode active material layer 86 may be spaced apart from the anode current collector 82 to prevent electrode wrinkling due to an acryl-based binder.

In some embodiments, a thickness of the second anode active material layer 86 may be greater than a thickness of the first anode active material layer 84. Accordingly, the first anode active material layer 84 may be provided as a substantially thin adhesive layer, and the second anode active material layer 86 may implement sufficient expansion inhibition and output/capacity improvement.

In some embodiments, the SBR-based binder in the first anode active material layer 84 may form a concentration gradient of increasing tendency from a surface of the anode current collector 82 toward the second anode active material layer 86.

For example, the SBR-based binder may be distributed as a relatively small content within a lower layer portion of the first anode active material layer 84 adjacent to the anode current collector 82, and may be included with a relatively large content compared to the lower layer portion within a upper layer portion adjacent to the second anode active material layer 86.

Accordingly, interfacial adhesion strength between the first and second anode active material layers 84 and 86 and adhesion between the overall active material of the anode active material layer may be improved through the upper layer portion adjacent to the second anode active material layer 86.

In some embodiments, as the SBR-based binder migrates toward the upper layer portion in the first anode active material layer 84, an overlapping region 88 in which the SBR-based binder and the acryl-based binder are mixed may be formed within a region adjacent to an interface between the first anode active material layer 84 and the second anode active material layer 86.

Through the overlapping region 88, a decrease in adhesive strength in the second anode active material layer 86 may be prevented, and the overall adhesive strength of the anode active material layer may be increased.

In some embodiments, the acryl-based binder also may form a concentration gradient of increasing tendency from the interface of the first and second anode active material layers 84 and 86 toward an outer surface of the second anode active material layer 86.

For example, a content of the acryl-based binder in an upper layer portion adjacent to an outer surface of the second anode active material layer may be larger than a content of the acryl-based binder in a lower layer portion adjacent to the first anode active material layer of the second anode active material layer. Therefore, a sufficient amount of the acryl-based binder may effectively suppress expansion of the silicon-based active material by surrounding or covering an outer surface of the anode active material layer.

In some embodiments, each of the first anode binder included in the first anode active material layer 84 and the second anode binder included in the second anode active material layer 86 may include an SBR-based binder and an acryl-based binder together.

In this case, in the first anode hinder, a weight of the SBR-based binder may be greater than a weight of the acryl-based binder. For example, a weight ratio of the SBR-based binder to the acryl-based binder may be about 2 or more, preferably about 3 or more. In the second anode binders, a weight of the acryl-based binder may be greater than a weight of the SBR-based binder. For example, the weight ratio of the acryl-based binder to the SBR-based binder may be about 2 or more, preferably about 3 or more.

In some embodiments, a loading weight of the second anode slurry of the second anode active material layer 86 may be greater than or equal to a loading weight of the first anode slurry of the first anode active material layer 84. For example, a ratio of the loading weight of the second anode slurry to the loading weight of the first anode slurry may be about 1 to 4, preferably about 2 to 4.

Accordingly, electrode expansion may be sufficiently suppressed through the acryl-based binder and output and capacity may be sufficiently improve through the silicone-based active material.

For example, when a thickness of the first anode active material layer 84 equals that of the second anode active material layer 86, an electrode density of the second anode active material layer 86 may be larger than an electrode density of the first anode active material layer 84. When an electrode density of the first anode active material layer 84 and the second anode active material layer 86 are the same, a thickness or volume of the second anode active material layer 86 may be greater than that of the first anode active material layer 84.

In some embodiments, an elongation rate of the anode 80 may be about 4% or more, or about 5% or more in one preferred embodiment. According to the above-described design of binders and anode active material layers, the anode 80 may have improved elasticity and stretching properties, and can maintain mechanical stability even during repeated charging and discharging.

For example, the elongation rate of the anode 80 measured under a condition in which a thickness of the anode current collector 82 is 8 μm or more, and a total thickness of the anode active material layers 84 and 86 is 50 μm to 200 μm may be about 4% or more, preferably about 5% or more.

The separator 60 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separator 60 may also include a non-woven fabric formed of a glass fiber with a high melting point, a polyethylene terephthalate fiber, or the like.

In some embodiments, an area and/or a volume of the anode 80 (e.g., a contact area with the separator 60) may be greater than that of the cathode 70. Thus, lithium ions generated from the cathode 70 may be easily transferred to the anode 80 without precipitation or sedimentation. Therefore, enhancement of capacity and power output may be effectively implemented according to applying the silicon-based active material described above.

Figure 2:
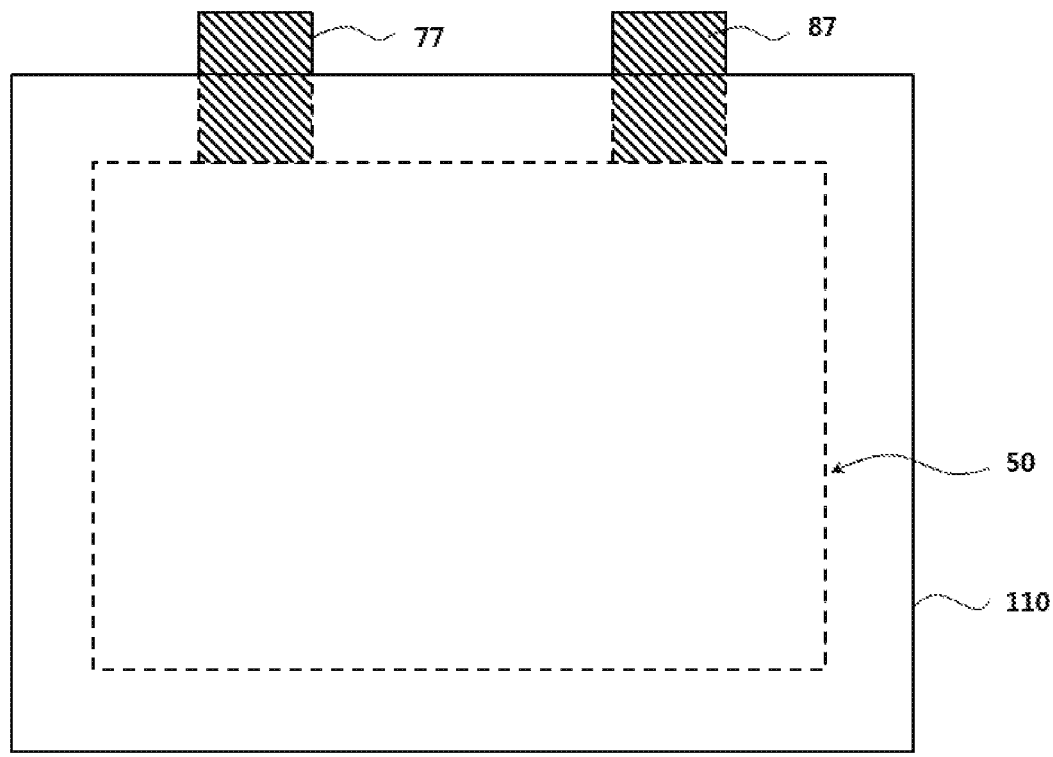
FIG. 2 is a schematic planar view illustrating a lithium secondary battery in accordance with exemplary embodiments.

FIG. 2 is a schematic planar view illustrating a lithium secondary battery in accordance with exemplary embodiments.

Referring to FIG. 2, a lithium secondary battery may be accommodated in an outer case 110 and may include an electrode assembly 50 described above.

In FIG. 1, for convenience of description, only one cathode 70 and one anode 80 are shown on top and bottom surfaces of the separator 60, respectively, but a plurality of unit cells in which each of those is defined as the cathode 70-separator 60-anode 80 can be stacked. For example, the electrode assembly 50 may be formed through winding, lamination, folding, and the like of the separator 60.

The electrode assembly 50 may be accommodated in an outer case 110 together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by Li$^+$X$^-$, and an anion of the lithium salt X$^-$ may include, e.g., F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$, (CF$_3$CF$_2$SO$_2$)$_2$N$^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As shown in FIG. 2, electrode tabs (cathode tab and anode tab) may be protruded from each of the cathode current collector 72 and the anode current collector 82 to extend to one end of the outer case 110. The electrode tabs may be welded together with the one end of the outer case 110 to form electrode leads (cathode lead 77 and anode lead 87) exposed at an outside of the outer case 110.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example 1

Example 1

A slurry was prepared by mixing Li[Ni$_{0.88}$Co$_{0.1}$Mn$_{0.02}$]O$_2$ as a cathode active material, carbon black as a conductive additive and polyvinylidene fluoride (PVdF) as a binder with a weight ratio of 96.5:2:1.5. The slurry was uniformly applied to an aluminum foil having a thickness of 12 μm, and vacuum dried at 130° C. to prepare a cathode for a lithium secondary battery.

A first anode slurry including 86 parts by weight of graphite, 10 parts by weight of silicon oxide (SiO$_x$, 0<x<2), 3.5 parts by weight of SBR/CMC binder (2.0 parts by weight of SBR and 1.5 parts by weight of CMC) and 0.5 parts by weight of CNT as a conductive additive was prepared. The first anode slurry was uniformly coated on a copper foil having a thickness of 8 μm.

The silicon oxide had a silicon content of 6 parts by weight with respect to 100 parts by weight of graphite based on ICP analysis.

A second anode slurry including 87.5 parts by weight of graphite, 10 parts by weight of silicon oxide, 2 parts by weight of PVA-PAA copolymer having a structural unit of Chemical Formula 1 as binder and 0.5 parts by weight of CNT as a conductive additive was prepared. The second anode slurry was applied on the first anode slurry which was coated.

After the first and second anode slurries were applied, an anode including a first anode active material layer (electrode density: 1.73 g/cc, thickness: 40 μm) and a second anode active material layer (electrode density: 11.73 g/cc, thickness: 93 μm) was formed by vacuum drying at 130° C. and pressing.

The cathode and the anode obtained as described above were notched with a proper size and stacked, and a separator (polyethylene, thickness: 13 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propenesultone (PRS), and 0.5 wt % of lithium bis (oxalato)borate (LiBOB) were added.

Example 2

A secondary battery was prepared in the same manner as in Example 1, except that polyacrylic acid (PAA) was used as the second anode slurry binder.

Comparative Example 1

A secondary battery was prepared in the same manner as in Example 1, except that the second anode active material layer was omitted, and an anode having a total thickness of 135 μm was formed using only the first anode slurry.

Comparative Example 2

A secondary battery was prepared in the same manner as in Example 1, except that the first anode active material layer was omitted, and an anode having a total thickness of 131 μm was formed using only the second anode slurry.

Comparative Example 3

A secondary battery was prepared in the same manner as in Example 1, except that silicon oxide was omitted from the anode active material and 96 parts by weight and 97.5 parts by weight of graphite were used for the first and second anode slurries, respectively.

Evaluation of Electrode Wrinkle

After full charging (CC/CV 0.5C 4.3V 0.05CA CUT-OFF) for each of the lithium secondary batteries of Examples and Comparative Examples, the surfaces of the anodes was visually observed to evaluate electrode wrinkles according to the following criteria.
<Criteria>
◎: Wrinkles not observed
Δ: Local wrinkle lines on the electrode surface
x: Wrinkles on the entire electrode surface Evaluation of Elongation Rate of Anode 13 mm*70 mm specimens were prepared from each of the anodes of the examples and comparative examples, and the elongation rate was measured using an elongation measuring device (UTM, Instron) (gap between upper and lower jig: 10 mm, elongation rate: 0.1 m/min).

Evaluation of Adhesion Force of Anode

For each of the anodes of the examples and comparative examples, the adhesive force was measured using an adhesive force measuring device (IMADA Z Link 3.1). Specifically, after attaching the anode surface to a tape, the force when tearing off at an angle of 90° was measured to evaluate the adhesive force.

Charge/Discharge Efficiency

The secondary battery according to Examples and Comparative Examples were charged (CC/CV ⅓C 4.2V 0.05C CUT-OFF) and discharged (CC ⅓ C 2.5V CUT-OFF), and each of initial charge capacity and discharge capacity was measured.

Charging and discharging efficiency was measured as a percentage value obtained by dividing the initial discharge capacity by the initial charge capacity.

Measurement of Interfacial Resistance of Anode

The interfacial resistance between the anode current collector (copper substrate) and the anode active material layer was measured under the following measurement conditions.
i) Equipment: Hioki XF057 Probe unit
ii) Condition: Current: 1.00 uA/voltage range: 0.5V
iii) Pin contact number: 500
The evaluation results were shown in Table 1 below.

TABLE 1

| | Wrinkle | Elongation rate (%) | Adhesion force (N) | Charge/Discharge efficiency (%) | Interfacial resistance ($\Omega/cm^2$) |
|---|---|---|---|---|---|
| Example 1 | ◎ | 5.34 | 0.69 | 89.8 | 0.02 |
| Example 2 | ◎ | 4.30 | 0.62 | 89.2 | 0.03 |
| Comparative Example 1 | ◎ | 4.22 | 0.59 | 89.0 | 0.02 |
| Comparative Example 2 | x | 3.82 | 0.53 | 89.2 | 0.03 |
| Comparative Example 3 | ◎ | 4.31 | 0.52 | 92.6 | 0.02 |

Referring to Table 1, electrode wrinkle was prevented in Examples including a multi-layer structure of a first anode active material layer including an SBR-based binder and a second anode active material layer including an acryl-based binder, and overall elongation/adhesion/electrical properties of the secondary battery were improved.

In Comparative Example 1 in which only the SBR-based binder was used and in Comparative Example 2 in which only the acryl-based binder was used, elongation rate and adhesion force were decreased, and electrode wrinkles were clearly observed in the case of Comparative Example 2.

Experimental Example 2

After preparing a secondary battery in the same manner as in Example 1 according to the anode active material composition (based on parts by weight) listed in Table 2, the properties (elongation, discharge capacity, interface resistance) of the battery were evaluated in the same manner as in Experimental Example 1.

The current collector of the anode in the secondary battery of Examples and Comparative Examples were separated and dissolved by strong acid. The dissolved solution was diluted with a pure water about 5,000 times, then measured by ICP (PerkinElmer, Agilent 720) method to obtain a weight ratio of Si/graphite.

TABLE 2

| | | SiOx | Graphite | Ratio of SiOx/ graphite | Ratio of Si/ graphite | Elongation rate (%) | Discharge capacity (mAh/g) | Interfacial resistance (Ω/cm²) |
|---|---|---|---|---|---|---|---|---|
| Sample 1 | First anode active material layer | 10 | 86 | 0.116 | 0.06 | 5.34 | 433 | 0.016 |
| | Second anode active material layer | 10 | 87.5 | 0.114 | 0.059 | | | |
| Sample 2 | First anode active material layer | 6 | 90 | 0.067 | 0.035 | 5.51 | 398 | 0.018 |
| | Second anode active material layer | 6 | 91.5 | 0.066 | 0.034 | | | |
| Sample 3 | First anode active material layer | 15 | 81 | 0.185 | 0.095 | 4.23 | 513 | 0.014 |
| | Second anode active material layer | 15 | 82.5 | 0.182 | 0.094 | | | |
| Sample 4 | First anode active material layer | 4 | 92 | 0.043 | 0.023 | 5.74 | 372 | 0.032 |
| | Second anode active material layer | 4 | 93.5 | 0.043 | 0.022 | | | |
| Sample 5 | First anode active material layer | 18 | 78 | 0.230 | 0.12 | 3.25 | 551 | 0.012 |
| | Second anode active material layer | 18 | 79.5 | 0.226 | 0.117 | | | |

Referring to Table 2, in case of Sample 1 to 3 having the weight ratio of Si/graphite of about 0.02 to 0.095, electrical properties such as discharge capacity and interface resistance were enhanced while maintaining an improved elongation rate.

Experimental Example 3

A secondary battery was prepared in the same manner as in Example 1, except that a mixture of artificial graphite and natural graphite was used as the graphite-based material included in the anode active material, and a ratio of artificial graphite to natural graphite was varied. The elongation rate of the anode and the discharge capacity of the battery were evaluated in the same manner as in Experimental Example 1.

The numerical values listed in Table 3 were parts by weight of artificial graphite and natural graphite based on a total of 10 parts by weight of graphite-based materials.

TABLE 3

| | Artificial graphite | Natural graphite | Artificial graphite/ Natural graphite | Elongation rate (%) | Discharge capacity (mAh/g) |
|---|---|---|---|---|---|
| Sample 6 | 10 | — | — | 5.401 | 433 |
| Sample 7 | 9 | 1 | 9 | 5.335 | 433 |
| Sample 8 | 7 | 3 | 2.33 | 5.079 | 434 |
| Sample 9 | 5 | 5 | 1 | 4.56 | 435 |
| Sample 10 | 3 | 7 | 0.42 | 3.773 | 436 |
| Sample 11 | 2 | 8 | 0.25 | 3.511 | 436 |

Referring to Table 3, the discharge capacity was improved as the amount of natural graphite increased, but the elongation rate was about 5% or more when the ratio of artificial graphite/natural graphite increased to about 2 or more.

What is claimed is:

1. A lithium secondary battery, comprising:
   a cathode;
   a separator; and
   an anode including an anode current collector and an anode active material layer formed on the anode current collector and facing the cathode with the separator interposed therebetween,
   wherein the anode active material layer includes,
   a first anode active material layer formed on the anode current collector and including a first anode active material and a first anode binder containing a styrene-butadiene-based rubber (SBR) binder; and
   a second anode active material layer formed on the first anode active material layer so that the first anode active material layer is interposed between the anode current collector and the second anode active material layer, the second anode active material layer including a second anode active material and a second anode binder containing an acryl-based binder, wherein the acryl-based binder does not include SBR therein, and
   each of the first anode active material and the second anode active material includes a silicon-based active material and a graphite-based material and contains 2 to 9.5 parts by weight of silicon with respect to the 100 part by weight of the graphite-based active material.

2. The lithium secondary battery according to claim 1, wherein the second anode binder includes a copolymer of poly(acrylic acid) and poly(vinyl alcohol) (a PAA-PVA copolymer).

3. The lithium secondary battery according to claim 1, wherein the first anode binder includes a mixture of SBR and a carboxymethyl cellulose (CMC).

4. The lithium secondary battery according to claim 1, wherein a loading weight including the second anode active material and the second anode binder within the second anode active material layer is larger than a loading weight including the first anode active material and the first anode binder within the first anode active material layer.

5. The lithium secondary battery according to claim 4, wherein the loading weight within the second anode active material layer is 1 to 4 times the loading weight within the first anode active material layer.

6. The lithium secondary battery according to claim 1, wherein the anode active material layer includes an overlapping region in which the SBR-based binder and the acryl-based binder are mixed, and the overlapping region is adjacent to an interface between the first anode active material layer and the second anode active material layer.

7. The lithium secondary battery according to claim 1, wherein a content of the SBR-based binder within an upper layer portion of the first anode active material layer which is adjacent to the second anode active material layer is larger than a content of the SBR-based binder within a lower layer portion of the first anode active material layer which is adjacent to the anode current collector.

8. The lithium secondary battery according to claim 1, wherein a content of the acryl-based binder within an upper layer portion of the second anode active material layer which is adjacent to an outer surface is larger than a content of the acryl-based binder within a lower layer portion of the second anode active material layer which is adjacent to the first anode active material layer.

9. The lithium secondary battery according to claim 1, wherein the graphite-based active material includes a mixture of an artificial graphite and a natural graphite.

10. The lithium secondary battery according to claim 9, wherein a weight ratio of the artificial graphite to the natural graphite is in range of 0.5 to 10.

11. The lithium secondary battery according to claim 9, wherein a weight ratio of the artificial graphite to the natural graphite is in range of 2 to 10.

12. The lithium secondary battery according to claim 1, wherein an elongation rate of the anode measured under a condition in which a thickness of the anode current collector is 8 μm or more, and a total thickness of the anode active material layer is 50 μm to 200 μm is 5% or more.

13. The lithium secondary battery according to claim 1, wherein the silicon-based active material includes $SiO_x$ ($0<x<2$).

* * * * *